(No Model.)

B. E. ALLEN.
DEVICE FOR LAYING OFF BASE BALL GROUNDS AND TENNIS COURTS.

No. 370,593. Patented Sept. 27, 1887.

Witnesses
L. R. Miller
R. G. Amies

Inventor
B. E. Allen
By his Attorney
Geo. R. Byington.

UNITED STATES PATENT OFFICE.

BENJAMIN E. ALLEN, OF NORWALK, CONNECTICUT.

DEVICE FOR LAYING OFF BASE-BALL GROUNDS AND TENNIS-COURTS.

SPECIFICATION forming part of Letters Patent No. 370,593, dated September 27, 1887.

Application filed October 20, 1886. Serial No. 216,778. (No model.)

*To all whom it may concern:*

Be it known that I, BENJAMIN E. ALLEN, a citizen of the United States, residing at Norwalk, in the county of Fairfield and State of Connecticut, have invented certain new and useful Improvements in Devices for Laying Off Base-Ball Grounds and Tennis-Courts; and I do hereby declare the following to be a full, clear, and exact description of the invention, such as will enable others skilled in the art to which it appertains to make and use the same.

My invention has relation to devices for laying off ball-grounds and tennis-courts.

The object of my invention is to provide a marker that will regulate the width of the line to be made and prevent the marking material from being scattered by the wind before reaching the ground or becoming packed against the sides of the body; and to this end the nature of my invention consists of constructions and combinations, all as will hereinafter be set forth in the specification, and particularly pointed out in the claims, reference being had to the accompanying drawings, in which—

Figure 1:
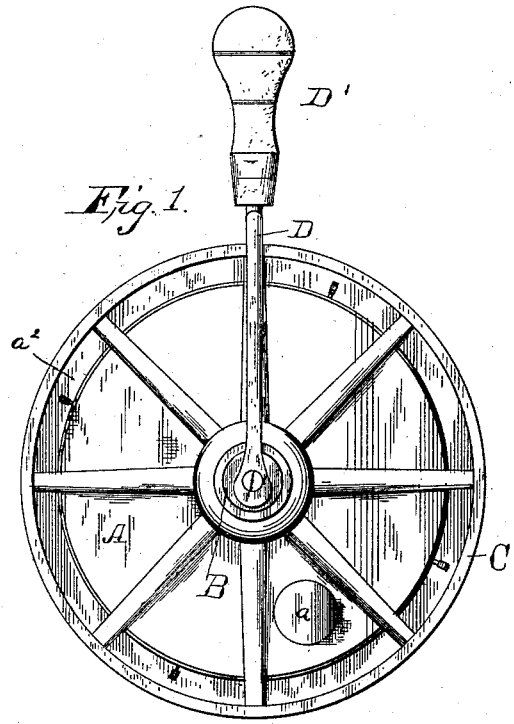
Figure 2:
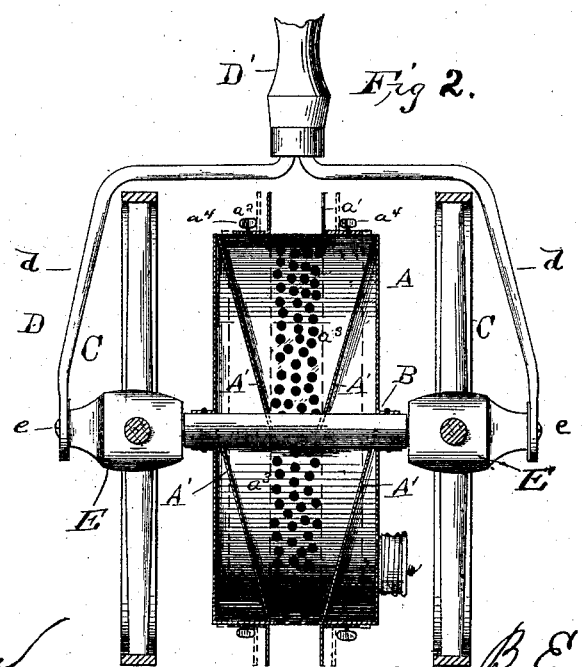

Figure 1 represents an end elevation of the machine, and Fig. 2 a transverse section.

A represents the body fixed to a shaft or axle, B, which extends entirely through the body A, having each end made smaller to allow the hubs E of the wheels C to slide thereon, and fastened in any well-known manner.

D is a ⋃-shaped frame, the arms $d$ of which are fastened on the outside of each hub E by means of a screw, $e$, which is screwed into the shaft or axle B, and is provided at the upper end with a handle, D', for moving the device over the field. The body A is hollow and provided upon one side with a capped opening, $a$, for the admission of the lime or other marking material. In the periphery of the body A are formed a series of holes, $a^3$, arranged circumferentially therein, so that as the body is moved they will be alternately presented to the ground, and the marking material within falls through those nearest the ground. On the inside of the body A, at each side, are flanges A', rigidly fastened at right angles to each other, which act as agitators to agitate the marking material, and at the same time prevent the material from packing against the sides of the body.

To guide the marking material in its passage to the ground, and to prevent it from being scattered by the wind before it is dropped, and at the same time to regulate the width of the line to be marked, independent flanges $a'$ $a^2$ on the periphery of the body are provided. One or both of these flanges may be adjustable longitudinally upon the cylinder to close one or more of the series of openings $a^3$ and regulate the width of the line, as shown by dotted lines, Fig. 2. To adjust these flanges on the body, slide them toward each other, and, if desired, fasten them to body A by means of thumb-screws or other fastening devices $a^4$.

Having fully described my invention, what I claim is—

1. In a ball-ground or lawn-tennis marker, the combination of a body or drum having openings in its periphery and two flanges, one on each side of the openings, one or both of which are movable to regulate the width of the openings, and the frame attached to the axle and having a handle, substantially as described.

2. In a ball-ground or lawn-tennis marker, the combination of a body or drum having a series of openings in its periphery and inside flanges to agitate the marking material, and the frame attached to the axle and having a handle, substantially as shown and described.

3. In a ball-ground or lawn-tennis marker, the combination of a body or drum having openings in its periphery, inside flanges to agitate the marking material, flanges on each side of the periphery, the axle and wheels, and a frame attached to the axle and having a handle, substantially as shown and described.

In testimony whereof I affix my signature in presence of two witnesses.

BENJAMIN E. ALLEN.

Witnesses:
GEO. R. BYINGTON,
JOHN RODEMEYER, Jr.